Figure 1:
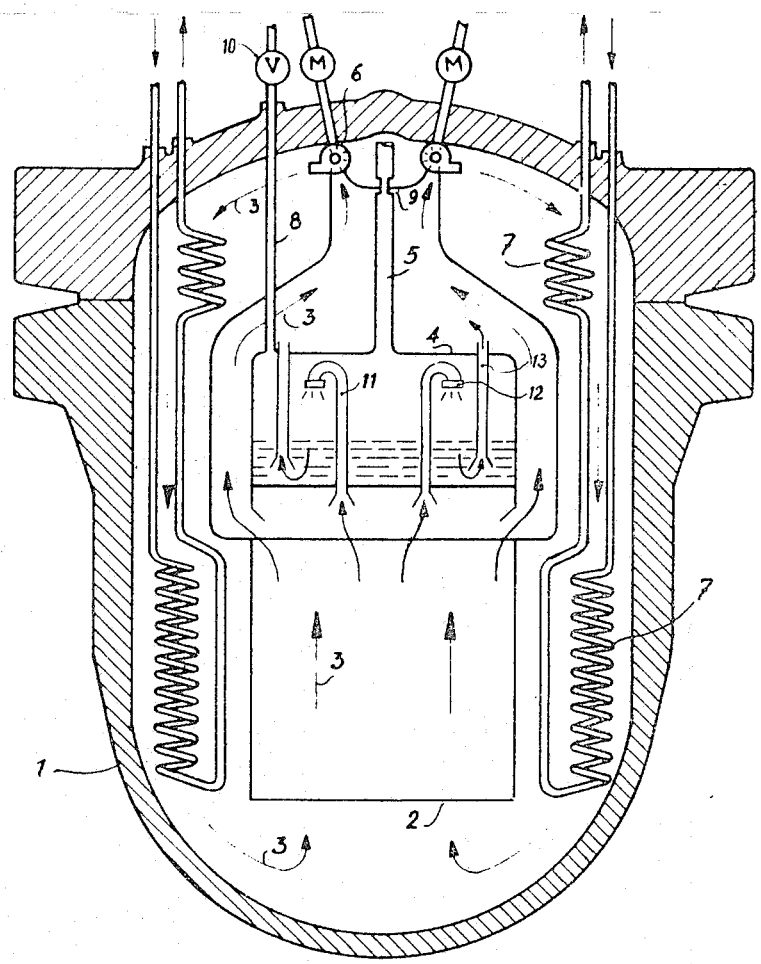

INVENTOR
PIERRE E.J.M. MALDAGUE
BY Hugo E. Weisberger
ATTORNEY

United States Patent Office 3,305,450
Patented Feb. 21, 1967

3,305,450
NUCLEAR REACTORS WITH PRESSURIZER OPERATING WITH NONCONDENSIBLE GAS
Pierre Edmond Jules Marie Maldague, Brussels, Belgium, assignor to Societe Anglo-Belge Vulcain, Societe Anonyme, Brussels, Belgium
Filed Feb. 9, 1965, Ser. No. 431,327
Claims priority, application Luxembourg, Mar. 23, 1962, 41,428/62
9 Claims. (Cl. 176—52)

This application is a continuation-in-part of application Serial No. 265,889, filed March 18, 1963, now abandoned.

The present invention relates to nuclear reactors of the type in which a fluid circulates which is at least partially in the liquid state; and more particularly to a novel method and apparatus for pressurizing such nuclear reactors. The invention concerns the pressurization of nuclear reactors in which a fluid circulates, whereby the pressure of said fluid is maintained within acceptable limits by a system which is self-regulating and essentially automatic. Said fluid may be of any nature, and its purpose may be for instance to act as a coolant, moderator, reflector, regulating fluid, intermediary fluid for the transfer of heat.

For the clearness of the description, the said fluid will be called hereinafter "primary fluid" and the circuit through which it flows "primary circuit." "Primary liquid" refers to the liquid state of the primary fluid.

When the primary circuit forms an enclosure of substantially constant volume, the fluid which passes through the circuit is generally subjected to variations of temperature as a function of the power of the reactor. These temperature variations produce pressure variations, which would exceed the limits acceptable for a correct working of the reactor, if means were not provided for maintaining the pressure between suitable limits.

In the reactors already known, the said means comprise generally a tank called "pressurizer" which acts as an expansion vessel for the primary liquid. The said pressurizer contains primary liquid at its lower portion, and contains vapor of said liquid in its upper portion above the liquid level. When the primary fluid expands for any reason, the level of the liquid inside the pressurizer rises, and the vapor volume decreases. This reduction of vapor volume would lead to pressure increase, unless accompanied by a condensation of part of the vapor by introduction in the upper portion of the pressurizer of liquid at a temperature lower than the temperature of saturation corresponding to the pressure of the pressurizer. Similarly, when the primary liquid is subjected to a reduction in volume, the level of the liquid inside the pressurizer is lowered, thus increasing the volume occupied by the vapor. The latter increase of vapor volume would lead to a reduction in pressure, unless accompanied by evaporation of part of the liquid in the lower portion of the pressurizer. This evaporation is carried out by means of electric resistances located in the lower portion of the pressurizer within the liquid. In order that the pressure shall be maintained substantially constant in the pressurizer, complicated regulating equipment is to be provided in order to adapt the production or the condensation of vapor to the rate required at any moment.

In accordance with the present invention there is provided a method of pressure control employing a pressurizer with greatly simplified action, which is self-regulating and essentially automatic in its operation.

In practicing the method of the invention, a nuclear reactor of the type in which a primary fluid circulates said fluid being at least partially in the liquid state, is provided with a pressurizing zone, in the form of a tank preferably located within the reactor. The method according to the present invention comprises the steps of maintaining in the pressurizing zone, a noncondensible gas, such as hydrogen or helium for instance, so that said gas will exert its own partial pressure within said zone. Primary fluid in the liquid state is maintained in the lower portion of the pressurizing zone to form a body of primary liquid therein, with the gas occupying the upper portion of the zone. The noncondensible gas is substantially saturated with the vapor of the primary fluid and forms a gas-vapor mixture above the liquid level in the zone. Primary fluid in the liquid state is continuously introduced into the gas-vapor mixture in the pressurizing zone at a point above the liquid level in the form of a finely divided stream. Thus the gas-vapor mixture above the liquid level becomes substantially saturated with respect to vapor of the primary liquid. Due to the partial pressure of the gas, it is possible to evaporate the primary liquid in the pressurizer at a temperature lower than the saturation temperature in the primary circuit, thus avoiding the use of special heating means like for instance electric resistances.

The gas contained in the said mixture may be a single gas or a mixture of several gases, and its partial pressure has a predetermined nominal value. The question is therefore not of a small amount of gas accidentally present in the vapor of primary liquid, as may be the case for fission gases issued from elements of nuclear fuel, or for gases due to the pyrolitic decomposition and/or radiolytic decomposition of the primary fluid. On the contrary, according to the present invention a substantial amount of gas is intentionally introduced in the upper portion of the pressurizer.

In order to ensure a large contact surface between the mixture gas-vapor and the primary liquid, means are used for dividing finely the primary liquid which passes through the said mixture; such means may be of any known type, and may for instance, comprise spray nozzles, pipes provided with orifices of small dimensions, pipes provided with a jet deflector.

Figure 2:
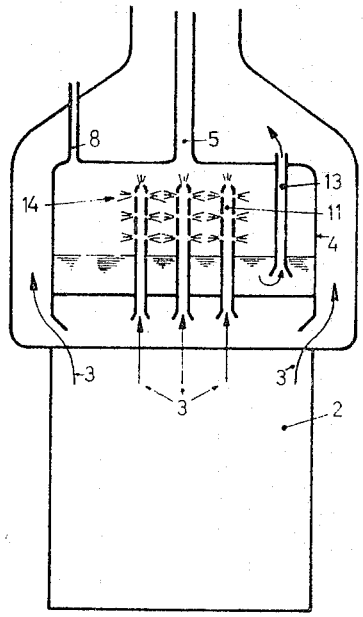
Figure 3:
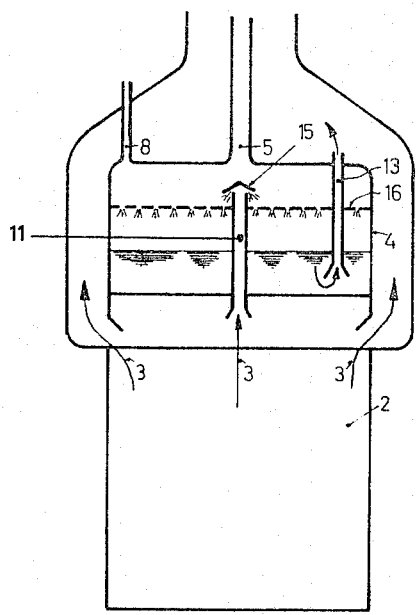

Referring to the accompanying drawings FIGURE 1 shows diagrammatically and by way of example one mode of carrying the invention into effect. FIGURES 2 and 3 show by way of examples a pressurizer as represented in FIGURE 1, comprising other types of pulverization means.

FIGURE 1 shows a reactor vessel 1 within which pumps 6 located at the top cause the flow of a primary fluid as indicated by the arrows 3, downwards past primary/secondary heat exchangers 7 and upwards through the core 2, to the inlet of the pumps 6 actuated by a motor. Part of the primary fluid from the core is caused to pass through the pipes 11 and is pulverized by the spray nozzles 12 in the mixture of gas-vapor contained in the chamber of pressurization 4. From the pressurizer 4 the primary fluid is returned through the pipes 13 to the inlet of the pumps 6. Gas which may be carried along by the flow of fluid accumulates at the highest point of the vessel and is returned through a pipe 5 to the pressurisation chamber 4. This pipe 5 is provided with a throttle 9 in order to avoid an important injection of fluid into the chamber 4 in the case no gas-vapor mixture should be left at the said highest point.

The reference numeral 8 designates a pipe for admission or removal of gas respectively to or from the pressurization chamber 4, this pipe is fitted with a valve 10, the opening of which permits such admission or removal.

FIGURE 2 shows a pressurizer 4 containing pipes 11 which comprise orifices 14 of small dimensions, allowing the dispersion of the primary fluid through the gas-vapor mixture.

In FIGURE 3 the pressurization chamber 4 contains a pipe 11 provided with a jet deflector 15, dispersing thus a jet of primary fluid over a large surface of a grid 16. Said grid 16 is placed above the maximum level of the liquid in the pressurizer and consists of interlaced metal wires.

In the reactor above described, an expansion or a volume reduction of the primary fluid, due for example to a variation of temperature which may take place simultaneously with a modification of the power of the reactor, produces a variation of the volume occupied by the gas-vapor mixture inside the pressurisation chamber 4. An increase or a decrease of this volume result respectively in a condensation or evaporation respectively of the vapor or the liquid in the pressurizer.

Such processes are not adiabatic, because heat exchanges take place between the gas-vapor mixture and the primary liquid with which it is in intimate contact, such heat exchanges producing a considerable formation and/or condensation of vapor. Because of such non-adiabatic processes the variations in total pressure of the mixture do not exceed those of the gas partial pressure. By keeping the gas partial pressure only a rather small fraction, e.g., about 15% of the total pressure, then even where large variations of the volume occupied by the gas-vapor mixture occur, the variations in the total pressure are rather small. It is to be noted that the pressure of the primary fluid need not to be kept within very narrow limits. In general, it is sufficient that this pressure shall be higher than, or at least equal to, a reference pressure, which may be, for instance, that of saturation corresponding to the temperature of the primary fluid at a predetermined point of the circuit. This predetermined point may be where the transfer of heat to the primary fluid is most intense. The temperature of the primary fluid at that point varies generally according to the mode of regulation of the reactor, and for that reason the pressure of the primary circuit may, without detriment, vary in consequence.

It is known that in a reactor the circuit of which is a fluid under pressure, the pressure has to be sufficient to prevent bulk boiling at any given moment at the outlet from the hottest channel, when the power has reached any value lower than, or equal to, the nominal power. In a reactor of that type, operating at full power, there is a definite difference between the temperature of the fluid leaving the hot channel and the average temperature of the fluid leaving the core. This temperature difference, which may vary as a function of the power, or of the duration, and of the burnup of the core, has a maximum value which corresponds to a definite difference in pressure of saturation.

According to the present invention, a value is given to the partial pressure of gas in the gas-vapor mixture which is at least equal to the said difference of pressure of saturation. In order to avoid a bulk boiling at the outlet from the hottest channel, a sufficient flow of liquid from the outlet of the core is caused preferably to pass through the area reserved to the gas-vapor mixture in the pressurizer.

The method and apparatus according to the invention are thus intrinsically automatic. They do not require any regulating device or a device for additional heating. They maintain the total pressure of the primary fluid at a value which is constantly adapted to the temperature of the fluid, for instance at the outlet from hottest channels of the core.

What has been said above is however true only if the amount of gas which is present in the chamber of pressurization, remains substantially constant. In practice, the said amount may increase in a non-substantial and un-deliberate manner, for instance by an admission of fission gas, or pyrolytical or radiolytical gas. It may also diminish when the gas enters into a solution in the primary liquid, and becomes fixed in the structural materials of the reactor.

The method according to the present invention requires therefore a checking of the value of the partial pressure of the gas inside the gas-vapor mixture. Such checking may be carried out simply by measuring the total pressure and the temperature of the gas-vapor mixture in the area or areas reserved to the mixture. The measured temperature allows of deducing the pressure of saturation of the vapor, and therefore its partial pressure in the gas-vapor mixture. By difference between the total pressure and the said pressure of the vapor, the partial pressure of the gas is deduced. If the latter is too high, it may be brought to the correct value by opening a blow-off valve placed in a piping derived at the upper part of the chamber of pressurization. If on the contrary, the partial pressure of the gas is too small, it may be brought to the correct value by opening a feeding valve for the gas, placed in a piping which connects the upper part of the chamber of pressurization with an outer tank containing gas under sufficient pressure. A piping and a single valve may be used in the two above said cases, the blow-off and feeding circuits being held separate only beyond the valve. Means may be provided for rendering automatic the feeding or removal of gas, from the indications supplied by the above said measuring apparatus.

In the above description, it has been supposed that the chamber of pressurization has a lower portion occupied by primary liquid and an upper portion occupied by the gas-vapor mixture, and that there was a flat liquid surface separating the two portions. It is clear that the invention generally applies to the case when owing to a systematic movement of rotation of the primary fluid, the liquid surface would be not flat, and owing to this, the notion of lower or upper portion would be accordingly interpreted. The invention applies also when an important portion of the liquid contained in the pressurizing chamber is in dispersed form obtained in any manner. It also applies when the liquid and/or the gas-vapor mixture contained in the chamber of pressurization has a temperature which is not uniform inside the said chamber.

By way of example only, a description will be given hereinafter of an application of the method and apparatus according to the present invention to a reactor as illustrated in FIGURE 1 working with pressurized water, of the spectral shift type.

The essential characteristics of the said reactor are as follows:

The reactor is moderated, cooled and if necessary reflected by a mixture of heavy water and light water, called primary fluid hereinafter;

The nuclear fuel consists of pellets of uranium oxide slightly enriched in U 235 and/or in plutonium, piled in cans of stainless steel, zirconium or any other known material;

The pressurizing chamber is filled with a mixture of hydrogen and water vapor. The whole of the primary fluid is placed in the reactor's vessel, including the heat exchangers and the pumps;

The total pressure of the primary fluid when leaving the core, is higher than, or equal to the pressure of saturation at the outlet from the channel or channels which are hottest at nominal power, under the most unfavorable conditions present during the life of the core;

The variations of the turbine load are followed automatically by the reactor without any movement of the shut-off rods. The regulation is therefore carried out through the effect of the coefficient of temperature of the primary fluid. It follows for instance that during a lowering of the load, an increase takes place of the average temperature of the primary fluid compensating the increase of reactivity due to a lowering of the temperature of the fuel (Doppler effect) and of the poisoning due to Xe 135;

The numerical data of the normal working are the following, calculated on the basis of the primary fluid consisting substantially of pure heavy water;

Nominal power, mwt. _____ 65
Mass flow of primary fluid, kg./sec. _____ 730
At full power (nominal power):
   Average temperature of the primary fluid at the inlet of the core, ° C. _____ 291.5
   Average temperature of the primary fluid inside the core, ° C. _____ 300.0
   Average temperature of the primary fluid at the outlet from the core, ° C. ____ 308.5
   Temperature of the primary fluid at the outlet from the hot channel, ° C. ____ 317
   Nominal volume occupied by the vapor-gas mixture inside the chamber of pressurization, l. _____ 600
   Total nominal pressure inside the chamber, ata. _____ 114.0
   Nominal partial pressure of the gas inside the chamber, ata. _____ 12.3
   Nominal partial pressure of the vapor inside the chamber, ata. _____ 101.7
For a power equal to zero:
   Uniform temperature of the primary fluid, ° C. _____ 306.5
   Nominal volume occupied by the gas-vapor mixture inside the chamber, l. _ 527
   Total pressure inside the chamber, ata. _ 112.5
   Partial pressure of the gas inside the chamber, ata _____ 14.0
   Partial pressure of vapor inside the chamber, ata. _____ 98.5

It is thus seen that between the two steady state conditions of the reactor and in this particular case, the variations of partial pressures of vapour and gas are of opposite directions and are very small.

Below is given by way of example the reaction of the reactor to a linear increase as a function of time, of the power required, from zero to the nominal value, within ten seconds.

The lowering of the average temperature of the primary fluid leads to a volume reduction of the liquid and therefore to an increase of the volume of the gas-vapor mixture. During the above said interval of time, the flow of primary fluid through the volume of gas supplies the heat required on the one hand for the production of additional steam for reaching the new condition of equilibrium vapor-liquid, and on the other hand for reheating gas-vapor mixture to bring it from 306.5° C. to 308.5° C., in spite of its expansion which has a tendency to cool it. The flow of water is carried out in such a manner as to be as fractionated as possible in order to have a very large exchange surface between the liquid on the one hand, and the vapor and gas, on the other hand. It may thus be reasonably supposed that at any moment the vapor and the gas occupying the gaseous volume are substantially at the same temperature as the liquid flowing through them.

A calculation shows that it is necessary to vaporize 5.4 kg. of primary fluid, which requires 1550 Kcal., and to bring 26 Kcal. to the gas-vapor mixture that is in all about 1576 Kcal. That heat energy is supplied in ten seconds by a flow of water of 730 kg./sec. with a lowering of temperature of the primary fluid through the volume of gas equal to 0.16° C. Such negligible lowering of the temperature of the primary fluid shows that the variation of the pressure between the two steady-state conditions will unavoidably follow almost immediately the load increase and therefore in a substantially linear manner.

A lowering of load leads to the same phenomena as above, stated, but in a reverse direction.

The difference in the volume occupied by the gas-vapor mixture between the nominal power and zero power is equal to 73 litres, of which 66 litres are due to a variation of volume of liquid due to the variation of temperature, and 7 litres are due to an exchange of 5.4 kg. of water between the liquid and the vapor phases.

In the example described, the main advantages of the process and of the device proposed for pressurization, are as follows:

The correct reaction of the reactor to variations of the demand, without any intervention of control rods, is not opposed by a bulk boiling produced inside the core through a reduction of the primary pressure;

The variations of pressure are small since they reach 1.5 kg./cm.$^2$ for a variation in the demand equal to the nominal power;

The reaction of the pressurizing device is entirely automatic and therefore does not require any regulating member nor any outer source of energy;

The system works without any loss of heat.

What is claimed is:

1. A nuclear reactor comprising a reactor pressure vessel, a core within said pressure vessel, a body of primary liquid in said pressure vessel, means for circulating said primary liquid through the vessel, a pressurizer tank containing a portion of said primary liquid, duct means connecting the primary liquid in said pressurizer tank with the primary liquid in said reactor pressure vessel, a body of noncondensible gas mixed with vapor of said primary liquid in said pressurizer tank located above said liquid portion, means for introducing noncondensible gas into said pressurizer tank, and means for introducing finely divided primary liquid into said body of noncondensible gas mixed with vapor in said pressurizer tank.

2. The reactor of claim 1 in which the pressurizer is provided with piping means leading to the upper portion of said reactor pressure vessel, gas in said piping means being at a pressure higher than that in said pressurizer, and means positioned in said piping means to inhibit the introduction of primary liquid therethrough.

3. The reactor of claim 1 in which the means for introducing finely divided primary liquid into the pressurizer comprises at least one conduit provided with orifices of small dimensions.

4. The reactor of claim 1 in which the means for introducing finely divided primary liquid into the pressurizer comprises a conduit provided at its discharge end with a deflector adapted to direct a jet of primary liquid against the surface of a foraminous distributing grid within the pressurizer.

5. A nuclear reactor comprising a reactor pressure vessel, a core within said pressure vessel, a body of primary liquid in said pressure vessel, means within said vessel for circulating said primary liquid through the vessel, a pressurizer located within said reactor vessel and containing a portion of said primary liquid, a body of noncondensible gas mixed with vapor of said primary liquid in said pressurizer located above said liquid portion, and means for introducing noncondensible gas into said pressurizer, said primary liquid circulating means including means for introducing finely divided primary liquid into said body of noncondensible gas mixed with vapor in said pressurizer.

6. Method of pressurizing a nuclear reactor of the type in which a primary fluid circulates within a pressure vessel and through a core within said pressure vessel, said fluid being at least partially in the liquid state, and which reactor includes a pressurizer tank containing a portion of said primary liquid, and duct means connecting the primary liquid in said pressurizer tank with the primary liquid in said pressure vessel, comprising the steps of introducing into said pressurizer tank a volume of noncondensible gas sufficient to enable the gas to exert a substantial partial pressure within the pressurizer tank and allowing said gas to become mixed with the vapor of said primary liquid, establishing in the lower portion of said pressurizer tank a body of said primary liquid, and continuously circulating a flow of primary liquid in finely divided form into said mixture of noncondensible gas and vapor above said body of primary liquid.

7. The method of claim 6 in which there is circulated through said pressurizer a substantial flow of primary liquid supplied from the outlet of said core.

8. The method of claim 6 in which the volume of the non-condensible gas is maintained at a value sufficient to avoid bulk boiling of the primary liquid in the reactor primary fluid circuit.

9. Method of pressurizing a nuclear reactor of the type in which a primary fluid circulates within a pressure vessel and through a core within said pressure vessel, said fluid being at least partially in the liquid state, and which reactor includes a pressurizer located within said pressure vessel, comprising the steps of introducing into said pressurizer a volume of a noncondensible gas sufficient to enable the gas to exert a substantial partial pressure within the pressurizer and allowing said gas to become mixed with the vapor of said primary liquid, establishing in the lower portion of said pressurizer a body of said primary liquid, and continuously circulating a flow of primary liquid in finely divided form into said mixture of noncondensible gas and vapor above said body of primary liquid.

References Cited by the Examiner

UNITED STATES PATENTS

| | | | |
|---|---|---|---|
| 2,956,553 | 10/1960 | Bell | 176—65 X |
| 2,990,349 | 6/1961 | Roman | 176—61 X |
| 3,060,110 | 10/1962 | Wainrib | 176—50 X |
| 3,114,414 | 12/1963 | Judd | 176—65 X |
| 3,150,051 | 9/1964 | Ammon | 176—65 X |
| 3,201,319 | 8/1965 | Mackney et al. | 176—54 |

FOREIGN PATENTS

| | | |
|---|---|---|
| 613,363 | 1/1961 | Canada. |
| 1,344,738 | 10/1963 | France. |
| 1,350,228 | 12/1963 | France. |
| 1,351,253 | 12/1963 | France. |

CARL D. QUARFORTH, *Primary Examiner.*

L. DEWAYNE RUTLEDGE, LEON D. ROSDOL,
*Examiners.*